Jan. 7, 1969   W. F. NEWBOLD   3,421,082
REBALANCING VOLTMETER HAVING VOLTAGE RESPONSIVE ERROR SENSING
MEANS AND MEANS TO BUCK OUT CURRENT DRAWN BY
AN INPUT IMPEDANCE
Filed Jan. 8, 1964
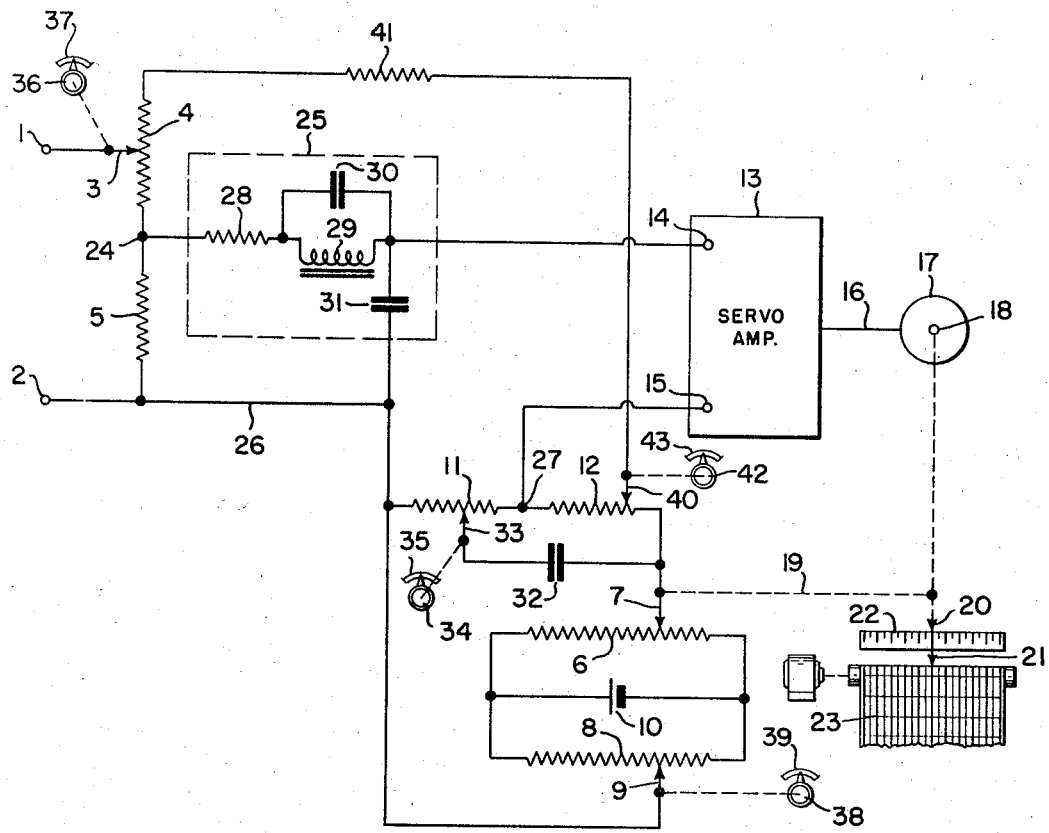
INVENTOR.
WILLIAM F. NEWBOLD
BY
ATTORNEY.

United States Patent Office 3,421,082
Patented Jan. 7, 1969

3,421,082
REBALANCING VOLTMETER HAVING VOLTAGE RESPONSIVE ERROR SENSING MEANS AND MEANS TO BUCK OUT CURRENT DRAWN BY AN INPUT IMPEDANCE
William F. Newbold, Springfield Township, Pa., assignor to Honeywell Inc., a corporation of Delaware
Filed Jan. 8, 1964, Ser. No. 336,527
U.S. Cl. 324—99                                   10 Claims
Int. Cl. G01r 17/06

ABSTRACT OF THE DISCLOSURE

Apparatus including a slidewire automatically adjusted to the balance position wherein its voltage balances a voltage to be measured. An attenuator connected across the source of the latter voltage permits adjustment of the measuring span. An adjustable compensating connection between the attenuator and the slidewire passes through the attenuator a current from the slidewire which follows the position of the slidewire and is proportioned to prevent any flow of current from the source through the attenuator when the slidewire is in the balance position.

---

The present invention relates generally to measuring apparatus of the null-balance, potentiometric type, and relates specifically to apparatus of this type which is provided with specific means for determining and changing the apparatus span, thereby to permit the accurate measurement of voltages having widely different ranges of variation. More specifically, the invention relates to such apparatus wherein neither the presence nor the adjustment of the span-determining or changing means adversely or undesirably affects the normal operation of the apparatus.

A general object of the present invention is to provide improved potentiometric measuring apparatus of the foregoing type. A specific object of the invention is to provide such improved apparatus which is characterized by its simplicity and utility relative to the previously-known apparatus of this type.

Adjustable span potentiometric measuring apparatus as provided in the past has often included as the span-adjusting means a device for adjusting the voltage across the potentiometric rebalancing resistor. This previously known type of span adjustment has the practical disadvantage, however, of causing the apparatus sensitivity to change as the span is changed. Accordingly, it has been proposed in the past to equip such apparatus with means for either manually or automatically adjusting an apparatus sensitivity control as the span-adjusting control is varied. However, such additional means has been found to complicate the apparatus unduely in most instances.

In other adjustable span potentiometric instruments which have been provided in the past, the span-determining or span-adjusting means has been in the form of a voltage divider or attenuator associated with the input voltage, i.e., with the voltage to be measured. While such an input attenuator constitutes a relatively simple means for determining and making adjustable the instrument span, and is a device whose adjustment does not change the apparatus sensitivity, such an attenuator does have the inherent disadvantage of causing current to be drawn from the source of the voltage to be measured, even when the apparatus is in so-called potentiometric balance. Accordingly, the use of such an attenuator has prevented the previously-known apparatus embodying it from being truly potentiometric in its operation. The disadvantage of such drawing of current from or through the source is, of course, that any internal impedance of the source causes such current to introduce errors into the measurements being made.

It is a prime object of the present invention, therefore, to provide improved potentiometric measuring apparatus which includes span-determining and adjusting means, but which is not subject to the foregoing disadvantages which have been associated with the previously known apparatus. Specifically, it is an object of the invention to provide adjustable span potentiometric measuring apparatus wherein the instrument sensitivity is inherently unaffected by the adjustment of the span-adjusting means, without the need for any sensitivity-adjusting device, and wherein there is no current drawn from the input source when the apparatus is in balance.

To the end of fulfilling the foregoing and other related desirable objects, the novel apparatus according to the present invention employs an input attenuator as the span-determining means, and also employs compensating means cooperating with the attenuator to prevent the latter from drawing current from the source of input voltage when the apparatus is in balance. Specifically, the last-named means is arranged to pass a compensating current through the attenuator, which current, when the apparatus is in potentiometric balance, prevents any flow of current from the source through the attenuator. Further according to the invention, this compensating current is advantageously derived from the source of potentiometric balancing voltage.

A better understanding of the present invention may be had from the following detailed description of one form of potentiometric measuring apparatus embodying the invention. This description is to be read in connection with the accompanying drawing, in which the single figure is a schematic circuit diagram of said apparatus.

The potentiometric measuring apparatus of the drawing is of the self-balancing, indicating and recording type, and includes input terminals 1 and 2 which are arranged for connection across the source, not shown, of the voltage which is to be measured by the apparatus. The terminal 1 is connected to the adjustable contact 3 of a first span resistor 4 which has its lower end connected through a second span resistor 5 to the input terminal 2. Accordingly, the voltage to be measured or input voltage is impressed across that portion of the series-connected span resistors 4 and 5 which lies between the contact 3 and the terminal 2. As a result, for any given position of the contact 3, a predetermined percentage of this input voltage appears across the resistor 5. The resistors 4 and 5 and the contact 3 constitute the span-determining input attenuator of the apparatus as will be discussed further hereinafter.

The present apparatus includes also a balancing network or source of adjustable balancing voltage which includes a balancing slidewire resistor 6 having an adjustable contact 7, a zero resistor 8 having an adjustable contact 9, and a source of energizing voltage 10 connected across the resistors 6 and 8 in parallel. The source 10 may be a battery or a suitably regulated power supply.

Two resistors 11 and 12, constituting balancing resistance means, are connected in series between the balancing slidewire contact 7 and a point in the balancing network formed by the zero resistor contact 9. Accordingly, for a given setting of the contact 9, there is produced across the resistors 11 and 12 an adjustable balancing voltage which varies as the position of the balancing contact 7 is varied along the resistor 6.

As noted above, the apparatus being described is of the self-balancing potentiometric type. Therefore, the apparatus is so arranged that the contact 7 is automatically adjusted as necessary to maintain a balance between the balancing voltage and the voltage to be measured. To this end, the apparatus includes an error voltage detector or servo amplifier 13 having input terminals 14 and 15 and an output connection 16. A servo or balancing motor 17, having an output shaft 18, is connected to and energized by the amplifier output 16. The amplifier 13 and motor 17 may be of any of the well-known forms of such servo apparatus, and may well be of the specific type disclosed and claimed in the Willis Patent No. 2,423,540. In the manner explained in that patent, the shaft 18 is caused to rotate as long as an error voltage is applied to the amplifier input terminals 14 and 15, the direction of this rotation being dependent upon the polarity of the applied error voltage.

The shaft 18 is mechanically coupled by a linkage 19 to the slidewire contact 7, to an indicating pointer 20, and to a recording pen 21. This coupling is such that the rotation of the shaft 18 simultaneously adjusts or positions the contact 7 along the resistor 6, the pointer 20 along a cooperating indicating scale 22, and the pen 21 over a cooperating recording medium 23. The detailed construction and operation of such a coupling and the means adjusted therethrough may well be as disclosed in said Wills patent.

The error voltage which actuates the balancing motor 17 is the resultant obtained by opposing, in the input of the amplifier 13, that portion of the balancing voltage which appears across the resistor 11 to that portion of the input voltage which appears across the resistor 5. To this end, the resistors 5 and 11 are connected in a series circuit between the amplifier input terminals 14 and 15. Specifically, the junction 24 between the span resistors 4 and 5, and hence the upper end of the resistor 5, is connected through a filter circuit 25 to the amplifier input terminal 14. Further, the lower end of the resistor 5 is connected by a conductor 26 to that end of the resistor 11 which is connected to the contact 9. Finally, the junction or detector point 27 between the resistors 11 and 12 is connected to the amplifier input terminal 15. These connections oppose the resistor 11 voltage to the resistor 5 voltage in the amplifier input.

The filter 25 includes a resistor 28 and an inductor 29 connected in series in the connection between the junction 24 and the terminal 14. A capacitor 30 of the filter is connected in parallel with the inductor 29, and a second capacitor 31 of the filter is connected between the terminal 14 and the conductor 26. The filter 25 serves the usual purpose of preventing unwanted signals from reaching the input of the amplifier 13.

In the operation of the apparatus as described so far, any inequality between the balancing voltage across the resistor 11 and the input voltage across the resistor 5 causes an error voltage to be impressed between the amplifier input terminals 14 and 15. In the presence of such an error voltage, the motor 17 drives the contact 7 along the slidewire 6 in the direction and to the extent necessary to change the balancing voltage across the resistor 11 until this opposing voltage is substantially equal to the voltage across the resistor 5. At that time, the error voltage will have been reduced substantially to zero, the motor 17 will no longer be energized for rotation, and the contact 7, pointer 20, and pen 21 will have been adjusted to an apparatus balance position which is a function of the input voltage across the resistor 5. Since this voltage is a predetermined percentage of the input voltage, for any given position of the span contact 3, the balance position of the contact 7 is a measure of the input voltage.

In order to minimize any tendency of the apparatus to overshoot the balance point and hence to hunt during its rebalancing operations, the apparatus is provided with an anti-hunting or damping circuit. This circuit includes a capacitor 32 which is connected between the slidewire contact 7 and a contact 33 which is adjustable along the resistor 11. An adjusting knob 34 and cooperating scale 35 are provided to facilitate the positioning of the contact 34 as necessary to secure the required amount of damping.

In order to make it possible to use the present apparatus for accurately measuring and recording voltages which vary over different ranges, the apparatus is of the adjustable span type, as noted hereinbefore. This means that the total number of voltage units, such as millivolts or volts, represented by the scale 22 between its zero-scale and full-scale ends can be changed as required to be commensurate or compatible with the range over which a given input voltage is likely to vary in the course of its measurement and recording. As also noted hereinbefore, the specific span determining and changing means for the apparatus is the input attenuator formed by the resistors 4 and 5 and the contact 3.

Specifically, the position of the contact 3 along the resistor 4 determines the apparatus span. The electrical effect on the apparatus circuit of this position is that it determines the ratio of the resistance of the resistor 5 to the total resistance between the terminals 1 and 2, and hence determines the ratio of the voltage across the resistor 5 to the total input voltage. In other words, the position of the contact 3 selects the percentage of the input voltage which is to be compared with and opposed to the balancing voltage of the resistor 11 in the input of the amplifier 13. It is in this manner that the position of the contact 3 determines the span of the apparatus.

When the contact 3 is in its lowest position on the resistor 4, the apparatus span has its minimum value, e.g., one-tenth of a millivolt. With such a span, a change in the input voltage of one-tenth of a millivolt will cause full-scale travel of the contact 7, pointer 20, and pen 21. When the contact 3 is in its uppermost position, the apparatus span has its maximum value, e.g., fifty volts. For this span, a change of fifty volts in the input voltage is required to produce full-scale travel of the contact 7. For positions of the contact 3 intermediate the maximum and minimum span positions, the apparatus will have various spans which lie between the maximum and minimum spans noted above.

To facilitate the setting of the contact 3 and hence the instrument span, the contact 3 is provided with an adjusting knob 36 and a cooperating span indicating scale 37. Desirably, the apparatus is so arranged that the position of the contact 3 is adjustable to discrete points or positions along the resistor 4, each of these positions representing a discrete value of the instrument span.

The adjustable contact 9 on the zero resistor 8 provides a means by which the electrical zero or suppression of the apparatus can be adjusted. That is, the position of the contact 9 determines the position of the electrical zero of the apparatus relative to the scale 22. To facilitate its adjustment, the contact 9 is provided with a knob 38 and a cooperating scale 39.

For the purpose of preventing the attenuator or span resistors 4 and 5 from drawing current from the source connected between the terminals 1 and 2 when the apparatus is in balance, the apparatus includes a compensating means or circuit. This circuit serves the above purpose by causing a controlled compensating current to flow through the resistors 4 and 5, as mentioned hereinbefore. In accordance with the present invention, the apparatus adjusts the value of this compensating current automatically so that this value, for apparatus balance, is the same as the value of the current which the source would have caused to flow through the resistors 4 and 5, in the absence of the compensating circuit, if the source had had zero internal impedance. Stated differently, the compensating circuit automatically sends through the resistors 4 and 5 a compensating current of such a value as to make it unnecessary for the source to supply any current, or for any current to flow through the source or the conductors' connectors through the terminals 1 and 2, when the apparatus is in balance. As a result, the impedance of the source becomes immaterial, since, with no current flow through the source, any such impedance cannot introduce errors into the measurement of the true source voltage.

To the end of producing the aforementioned controlled compensating current flow through the resistors 4 and 5, the compensating circuit includes a connection between a contact 40, in engagement with the resistor 12, and the upper end of the resistor 4. The last-mentioned connection includes a series resistor 41.

It is the potential difference between the conductor 26 and the point on the resistor 12 engaged by the contact 40 which causes the compensating current to flow through the resistors 41, 4, and 5. Since this potential difference is a function of the balancing voltage applied across the resistors 11 and 12, the value of the compensating current varies as the position of the balancing contact 7 is varied. By the proper initial selection of the relative values of the resistances in the apparatus circuit, the movement of the balancing contact 7 is caused to vary the value of the compensating current in such a way that, at the completion of each rebalancing operation of the apparatus, the compensating current has the same value as that which the source would have been required to send through the resistors 4 and 5 in the absence of the compensating circuit. That is, the apparatus balance position of the contact 7 causes the compensating current to have the value necessary to prevent any flow of current in the external source circuit connected between the terminals 1 and 2.

For the purpose of establishing the proper initial resistance relationships to secure the operation just described, it is convenient to consider a portion of the apparatus circuit as being in the form of a bridge circuit. Specifically, the contact 40 and the conductor 26 can be considered as the input terminals of this bridge, while the junctions 24 and 27 can then be considered as the bridge output terminals. Between these bridge input and output terminals there are then four bridge arms, made up of the resistors 4, 5, 11, 12, and 41. This bridge circuit can be traced from one bridge input terminal 40 through the first bridge arm resistor 12 to one bridge output terminal 27, and then through the second bridge arm resistor 11 to the other bridge input terminal 26. The third bridge arm includes the resistors 41 and 4 extending from the one bridge input terminal 40 to the other bridge output terminal 24, while the fourth bridge arm resistor 5 is connected between the last mentioned output terminal and the other bridge input terminal 26. The balancing network, including the elements 6 through 10, supplies the aforementioned adjustable balancing voltage as a bridge input voltage between the bridge input terminals 26 and 40, while the input terminals 14 and 15 of the amplifier 13 are connected to the respective bridge output terminals 24 and 27. Finally, the voltage to be measured is applied across a portion of the bridge arms formed by the resistors 4 and 5, as a result of the connection of the terminal 1 to the contact 3 on the resistor 4, and the connection of the terminal 2 to the bridge input terminal 26.

The criterion for use in establishing the proper relative values of the resistances in the circuit so as to obtain the desired compensating current as described above is that the above-described bridge circuit must be balanced when no source is connected between the input terminals 1 and 2. That is, the values for the resistors 4, 5, 11, 12, and 41 must be so chosen that substantially no signal is supplied to the amplifier input terminals 14 and 15, for any position of the balancing contact 7, for the condition of an open circuit between the terminals 1 and 2. This means that the ratio of the resistance of the resistor 11 to the resistance of that part of the resistor 12 between the point 27 and the contact 40 must be made equal to the ratio of the resistance of the resistor 5 to the sum of the resistances of the resistors 41 and 4, for the condition of an open circuit between the input terminals 1 and 2, in order that the above-described balancing current and its desired action will be produced in the apparatus.

The purpose of making the contact 40 adjustable is to provide a means to facilitate the adjustment of the compensating current so that the latter will properly perform its compensating function in subsequent measuring operations. To facilitate such adjustment of the contact 40, the latter is provided with a knob 42 and a cooperating scale 43.

In conclusion, it is seen that the improved apparatus according to the present invention employs the simple attenuator resistors 4 and 5 as its span-adjusting means, making unnecessary any sensitivity-compensation in the apparatus, and also employs a novel, relatively simple compensating current circuit which, by automatically passing through the resistors 4 and 5 a controlled compensating current derived from the adjustable balancing voltage across the resistors 11 and 12, prevents the resistors 4 and 5 from drawing current from the source of voltage under measurement. It is also seen that the utility of this compensating circuit is not restricted to apparatus wherein the span attenuator is adjustable, but that this circuit is useful also where it is necessary or desirable to employ a fixed input voltage dividing attenuator.

What is claimed is:

1. Potentiometric measuring apparatus comprising adjustable means arranged to supply an adjustable balancing voltage, span resistance means arranged for connection across a source of voltage to be measured, an error voltage detector having an input, circuit means interconnecting said resistance means and said adjustable means to said input of said detector to oppose at least a portion of said balancing voltage to at least a portion of the voltage of said source to form an error voltage in said input of said detector, thereby to permit the adjustment of said adjustable balancing voltage to the value at which said error voltage is reduced substantially to zero, and compensating means connected to said resistance means to pass therethrough a compensating current which prevents the flow of current from said source through said resistance means whenever said error voltage is substantially zero.

2. Potentiometric measuring apparatus comprising balancing resistance means arranged to have an adjustable voltage produced thereacross, span resistance means, a pair of input terminals arranged for connection to a source of voltage to be measured, means connecting said terminals to displaced points on said span resistance means, an error voltage detector having a pair of error terminals, means connecting at least a portion of said balancing resistance means and at least a portion of the part of said span resistance means between said points in a series voltage opposition circuit between said error terminals, thereby to permit said voltage across said balancing resistance means to be adjusted to the value at which the error voltage between said error terminals is reduced substantially to zero, and compensating means connected to said span resistance means to pass therethrough a compensating current which prevents the flow of current from said source through said span resistance means whenever said error voltage is substantially zero.

3. Apparatus as specified in claim 2, wherein said compensating means derives from said balancing resistance means said compensating current which is passed through said span resistance means.

4. Potentiometric measuring apparatus comprising a bridge circuit having a pair of input terminals, a pair of output terminals, and four resistance bridge arms interconnecting said terminals, balancing means arranged to supply an adjustable voltage between said input terminals, input conductors arranged for connection to a supply of a voltage to be measured and connected between displaced points on two adjacent ones of said bridge arms embracing one of said output terminals, and a voltage sensitive device connected between said output terminals and coupled to said balancing means to adjust said adjustable voltage as necessary to maintain substantially no voltage between said output terminals, the resistance values of said bridge arms being such as to prevent the flow of current from said supply through said input conductors when there is substantially no voltage between said output terminals.

5. Potentiometric measuring apparatus comprising a bridge circuit having a pair of input terminals, a pair of output terminals, and four bridge arms interconnecting said terminals, a first balancing resistor connected in a first of said arms between one of said input terminals and one of said output terminals, a second balancing resistor connected in a second of said arms between said one output terminal and the other of said input terminals, a first span resistor connected in a third of said arms between said one input terminal and the other of said output terminals, a second span resistor connected in a fourth of said arms between said other input terminal and said other output terminal, balancing means arranged to supply an adjustable voltage between said input terminals, input conductors arranged for connection to a supply of a voltage to be measured and connected between said other input terminal and a point on said first span resistor, and a voltage sensitive device connected between said output terminals and coupled to said balancing means to adjust said adjustable voltage as necessary to maintain substantially no voltage between said output terminals, the values of said resistors being such as to prevent the flow of current from said supply through said input conductors when there is substantially no voltage between said output terminals.

6. Apparatus as specified in claim 5, wherein the ratio of the resistance value of said first arm to that of said second arm is equal to the ratio of the resistance value of said third arm to that of said fourth arm when there is no connection between said input conductors other than said arms.

7. Potentiometric measuring apparatus, comprising a balancing network including a slidewire resistor arranged for connection across a source of energizing voltage and having an adujstable contact, balancing resistance means connected between said contact and a point in said network, whereby there is produced across said balancing resistance means a voltage which varies as the position of said contact along said slidewire is varied, a pair of span resistors connected in series, a pair of input terminals arranged for connection to a source of voltage to be measured, a connection between one of said terminals and a point on one of said span resistors, a connection between the other of said terminals and a point on the other of said span resistors, a servo amplifier having an input connected between a detector point on said balancing resistance means and the junction between said series-connected span resistors, and having an output, a connection between said point on said other span resistor and said point in said network, a servo motor connected to and energized from said output and mechanically coupled to said slidewire contact to move the latter along said slidewire, in the presence of an error voltage across said amplifier input, in the direction and to the extent necessary to reduce said error voltage substantially to zero, thereby to make the adjusted position of said contact along said slidewire a function of the value of the voltage to be measured, and a compensating connection between the free end of said one span resistor and a point on said balancing resistance means located on the slidewire contact side of said detector point to prevent the flow of current from said source when there is substantially no error voltage across said amplifier input.

8. Apparatus as specified in claim 7, wherein said compensating connection includes a resistor.

9. Apparatus as specified in claim 7, wherein said point at which said compensating connection is connected to said balancing resistance means is adjustable along the latter.

10. Apparatus as specified in claim 7, wherein a damping capacitor is connected between said adjustable contact and a point on said balancing resistance means.

References Cited

UNITED STATES PATENTS 2,547,105   4/1951   Williams _____ 324—100

RUDOLPH V. ROLINEC, Primary Examiner.

E. F. KARLSEN, Assistant Examiner.

U.S. Cl. X.R.

324—100